(12) United States Patent
Kim et al.

(10) Patent No.: US 7,759,453 B2
(45) Date of Patent: Jul. 20, 2010

(54) MULTIBLOCK COPOLYMER, METHOD OF PREPARING THE SAME, POLYMER ELECTROLYTE MEMBRANE PREPARED FROM THE MULTIBLOCK COPOLYMER, METHOD OF PREPARING THE POLYMER ELECTROLYTE MEMBRANE, AND FUEL CELL EMPLOYING THE POLYMER ELECTROLYTE MEMBRANE

(75) Inventors: Hae-kyoung Kim, Seoul (KR); Won-mok Lee, Seoul (KR); Jin-chul Jung, Seoul (KR); Hyuk Chang, Seongnam-si (KR); Sam-dae Park, Pohang-si (KR); Yoon-ju Chang, Pohang-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1085 days.

(21) Appl. No.: 11/443,169

(22) Filed: May 31, 2006

(65) Prior Publication Data

US 2007/0196712 A1    Aug. 23, 2007

(30) Foreign Application Priority Data

Feb. 20, 2006    (KR) .................. 10-2006-0016277

(51) Int. Cl.
*C08G 75/20* (2006.01)
(52) U.S. Cl. .................. 528/391; 429/33; 521/27; 521/33; 528/364
(58) Field of Classification Search ........... 528/391, 528/364; 521/27, 33; 429/33
See application file for complete search history.

(56) References Cited

U.S. PATENT DOCUMENTS

| | | | |
|---|---|---|---|
| 4,327,203 A * | 4/1982 | Deichert et al. ........... 526/279 |
| 4,435,496 A * | 3/1984 | Walls et al. .............. 430/285.1 |
| 5,857,992 A * | 1/1999 | Haak et al. .................. 604/20 |
| 6,248,469 B1 * | 6/2001 | Formato et al. ............. 429/41 |
| 6,555,288 B1 * | 4/2003 | Xu et al. ................. 430/270.1 |
| 7,038,004 B2 * | 5/2006 | Chen et al. .................... 528/86 |

FOREIGN PATENT DOCUMENTS

CN    1702099 A    11/2005

OTHER PUBLICATIONS

Mecham et al., Polymer Preprint, vol. 41(2), pp. 1388-1389 (2000).*
"Selectively sulfonated poly(aryl ether sulfone)-b-polybutadlene for proton exchange membrane", Xingpeng Zhang et al., Journal of Polymer Science Part B: Polymer Physics, vol. 44, Issue 4, pp. 665-672, Jan. 5, 2006.*
"Selectively sulfonated poly(aryl ether sulfone)-b-polybutadiene for proton exchange membrane", Xingpeng Zhang et al., Journal of Polymer Science Part B: Polymer Physics, vol. 44, Issue 4, pp. 665-672, Jan. 5, 2006.
Office Action issued Sep. 25, 2009, in corresponding Chinese Patent Application No. 2006100876586.

* cited by examiner

*Primary Examiner*—Peter D. Mulcahy
*Assistant Examiner*—Henry Hu
(74) *Attorney, Agent, or Firm*—Stein McEwen, LLP

(57) ABSTRACT

A multiblock copolymer includes a polysulfone repeating unit, a sulfonated polysulfone repeating unit and an ethylenic unsaturated group at a terminal of the multiblock copolymer. Also provided are a method of preparing the multiblock copolymer, a polymer electrolyte membrane prepared from the multiblock copolymer, a method of preparing the polymer electrolyte membrane, and a fuel cell including the polymer electrolyte membrane. The polymer electrolyte membrane that has a high ionic conductivity and good mechanical properties and minimizes crossover of methanol can be manufactured at low cost. In addition, the structure of the multiblock copolymer can be varied to increase selectivity to a solvent used in a polymer electrolyte membrane.

4 Claims, 4 Drawing Sheets

MULTIBLOCK COPOLYMER, METHOD OF PREPARING THE SAME, POLYMER ELECTROLYTE MEMBRANE PREPARED FROM THE MULTIBLOCK COPOLYMER, METHOD OF PREPARING THE POLYMER ELECTROLYTE MEMBRANE, AND FUEL CELL EMPLOYING THE POLYMER ELECTROLYTE MEMBRANE

CROSS-REFERENCE TO RELATED APPLICATION

This application claims the benefit of Korean Patent Application No. 2006-16277, filed on Feb. 20, 2006, in the Korean Intellectual Property Office, the disclosure of which is incorporated herein in its entirety by reference.

BACKGROUND OF THE INVENTION

1. Field of the Invention

Aspects of the present invention relate to a multiblock copolymer including a polysulfone repeating unit and a sulfonated polysulfone repeating unit and having an ethylenic unsaturated group at a terminal thereof, a method of preparing the multiblock copolymer, a polymer electrolyte membrane prepared from the multiblock copolymer, a method preparing the polymer electrolyte membrane, and a fuel cell employing the polymer electrolyte membrane. In particular, aspects of the present invention relate to a multiblock copolymer that has a high ionic conductivity and good mechanical properties and can be used to prepare a polymer electrolyte membrane that minimizes crossover of methanol, that has a low cost and in which the structure of the multiblock copolymer can be varied to increase selectivity to a solvent used in a polymer electrolyte membrane. Aspects of the present invention also relate to a method of preparing the multiblock copolymer, a polymer electrolyte membrane prepared from the multiblock copolymer, a method of preparing the polymer electrolyte membrane, and a fuel cell including the polymer electrolyte membrane.

2. Description of the Related Art

Fuel cells can be classified into polymer electrolyte membrane fuel cells (PEMFCs), phosphoric acid fuel cells (PAFCs), molten carbonate fuel cells (MCFCs), solid oxide fuel cells (SOFCs), etc., according to the type of electrolyte that is used. The working temperature of fuel cells and constituent materials therefor vary according to the type of electrolyte used in the cell.

According to the way of supplying fuel to the anode, fuel cells can be classified into an external reformer type where fuel is supplied to the anode after being converted into hydrogen-rich gas by an external reformer and an internal reformer type or direct fuel supply type where fuel in a gaseous or liquid state is directly supplied to the anode.

A representative example of a direct liquid fuel cell is a direct methanol fuel cell (DMFC), which is a type of PEMFC. DMFCs use aqueous methanol solution as fuel and a proton exchange polymer membrane with ionic conductivity as an electrolyte. DMFCs are small and lightweight but can achieve a high output density. In addition, an energy generating system having a simpler structure can be manufactured using PEMFCs such as DMFCs.

The basic structure of a PEMFC includes an anode (fuel electrode), a cathode (oxidant electrode), and a polymer electrolyte membrane disposed between the anode and the cathode. A catalyst layer for facilitating the oxidation of fuel is formed on the anode of the PEMFC, and a catalyst layer for facilitating the reduction of an oxidant is formed on the cathode of the PEMFC.

In the anode of the PEMFC, protons (hydrogen ions) and electrons are generated as a result of the oxidation of fuel. The protons migrate to the cathode through the polymer electrolyte membrane, and the electrons migrate to an external circuit (load) through a wire (or a current collector). In the cathode of the PEMFC, the protons transmitted through the polymer electrolyte membrane and the electrons transmitted from the external circuit through a wire (or a current collector) combine with oxygen, thereby generating water. The migration of electrons via the anode, the external circuit, and the cathode produces an electric current.

In PEMFCs, the polymer electrolyte membrane acts as an ionic conductor enabling migration of protons from the anode to the cathode and acts as a separator preventing a mechanical contact between the anode and the cathode. Thus, a high ionic conductivity, a high electrochemical stability, a high mechanical strength, a high thermal stability at working temperature, an easy processability into a thin film, etc., are desirable for the polymer electrolyte membrane.

Currently available materials for the polymer electrolyte membrane include polymer electrolytes, such as a perfluorinated sulfonate polymer (for example, NAFION, which is a registered trade mark of Dupont) having a fluorinated alkylene backbone and fluorinated vinylether side chains having sulfonic acid groups at the terminals thereof. Polymer electrolyte membranes composed of such a polymer electrolyte contain an appropriate amount of water and exhibit high ionic conductivity.

However, the transmission of methanol is low in such an electrolyte membrane, and the manufacturing cost of the electrolyte membrane is high. Furthermore, the ionic conductivity of the electrolyte membrane seriously decreases due to the loss of water caused by evaporation at a working temperature of 100° C. or higher, and eventually, the electrolyte membrane loses its inherent function. Thus, it is almost impossible to operate PEMFCs using such a polymer electrolyte membrane at 100° C. or higher under atmospheric pressure. For this reason, conventional PEMFCs have been operated at temperatures less than 100° C., such as, for example, about 80° C.

In addition, as the ionic conductivity of electrolyte membranes increases, the water transmission of electrolyte membranes increases. However, the increase in water transmission leads to an increase in methanol transmittance. Thus, the requirements for both high ionic conductivity and low methanol transmission cannot be simultaneously satisfied easily.

To overcome the above-described problems, research into polymer electrolyte membranes as replacements for the NAFION electrolyte membrane is being intensively performed. As a material for such polymer electrolyte membranes, a block copolymer comprising hydrocarbon repeating units, such as styrene repeating units, ethylene-r-butylene repeating units, isobutylene repeating units, etc., is known.

However, such a block copolymer typically exhibits methanol crossover and serious swelling of the electrolyte membrane, and thus the dimension stability of the membrane and electrolyte assembly (MEA) is poor. In addition, the hydrophobic properties and the mechanical properties of the electrolyte membrane are not so good.

SUMMARY OF THE INVENTION

Aspects of the present invention provide a multiblock copolymer that has a high ionic conductivity and good mechanical properties and in which the structure of the multiblock copolymer can be varied to increase selectivity to a solvent used in a polymer electrolyte membrane, a method of preparing the multiblock copolymer, a polymer electrolyte membrane prepared from the multiblock copolymer, and a fuel cell employing the polymer electrolyte membrane.

According to an aspect of the present invention, there is provided a multiblock copolymer comprising: a polysulfone repeating unit of formula (1) below; a sulfonated polysulfone repeating unit of formula (2) below; and an ethylenic unsaturated group at a terminal of the multiblock copolymer:

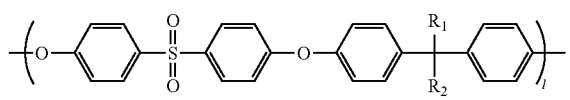

(1)

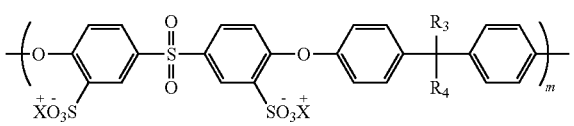

(2)

where l and m are integers of 1-200; each of $R_1$ through $R_4$ is independently hydrogen, fluorine, or a C1-C10 alkyl group optionally substituted by one or more fluorine atoms; and X represents a tetraalkylamine cation.

According to another aspect of the present invention, there is provided a method of preparing a multiblock copolymer, the method comprising: synthesizing a polymer of formula (3) below having a polysulfone repeating unit and a sulfonated polysulfone repeating unit by polymerizing disodiumsulfonate dichlorodiphenyl sulfone, dichlorodiphenylsulfone, and bisphenol A, wherein l and m are integers of 1-200; and reacting the polymer of formula (3) with a tetraalkylammonium hydride and an ethylenic unsaturated compound to substitute a Na+ion in the polymer with a tetraalkylamine cation and add a reactive group having an ethylenic unsaturated group to a terminal of the polymer.

According to another aspect of the present invention, there is provided a method of preparing a polymer electrolyte membrane, the method comprising: curing the above-described multiblock copolymer; soaking the cured multiblock copolymer in an acid solution to allow protonation; and washing the protonated multiblock copolymer in deionized water.

According to another aspect of the present invention, there is provided a polymer electrolyte membrane prepared using the above-described method.

According to another aspect of the present invention, there is provided a fuel cell comprising the above-described polymer electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

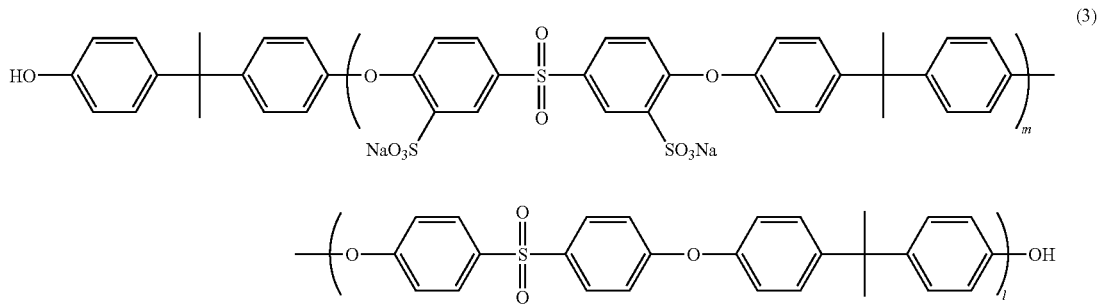

(3)

DETAILED DESCRIPTION OF THE EMBODIMENTS

Figure 1:
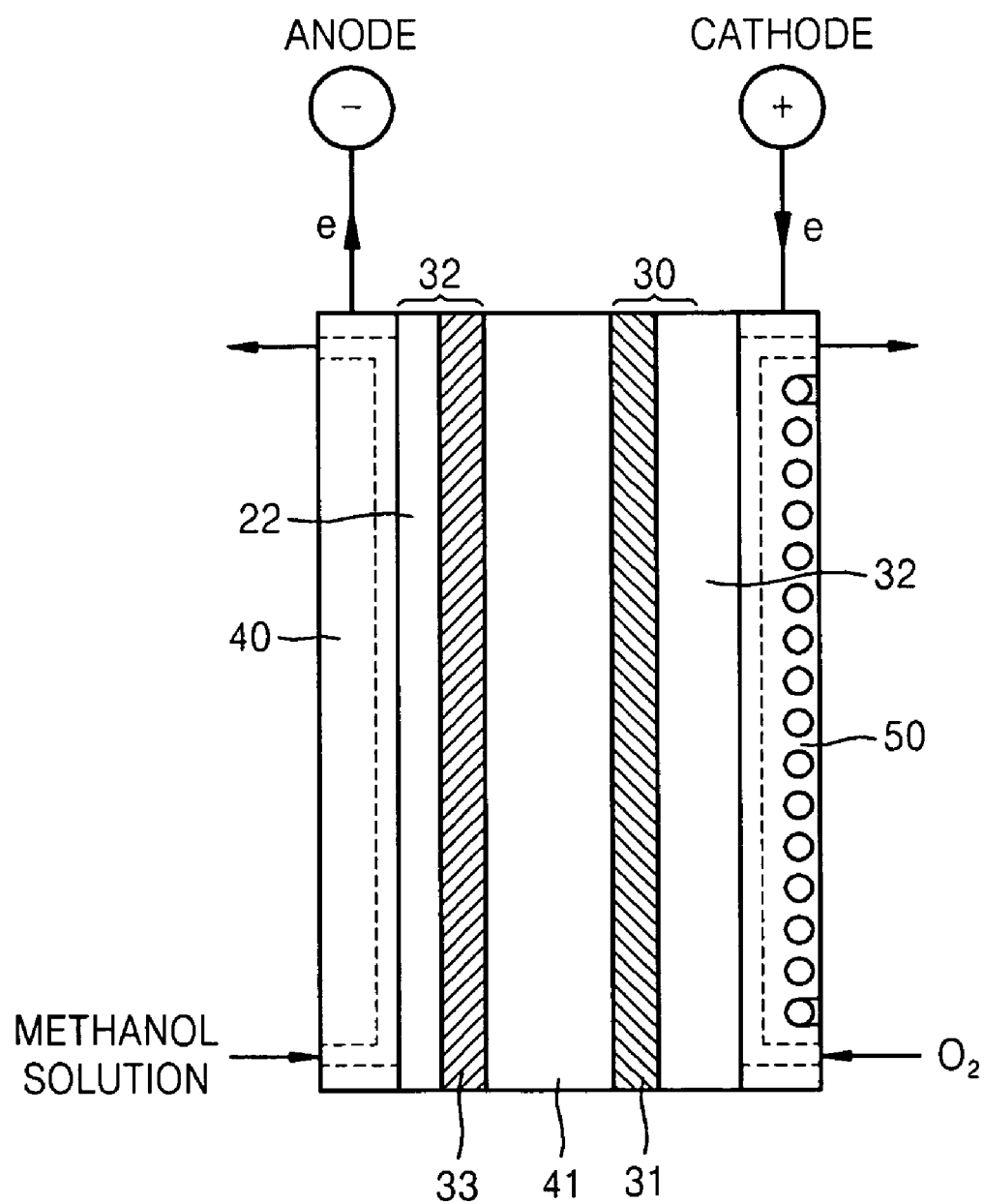
FIG. 1 is a schematic view of a fuel cell including a polymer electrolyte membrane according to an embodiment of the present invention.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

A multiblock copolymer according to an embodiment of the present invention includes a polysulfone repeating unit of formula (1) below, a sulfonated polysulfone repeating unit of formula (2) below, and an ethylenic unsaturated group at its terminal:

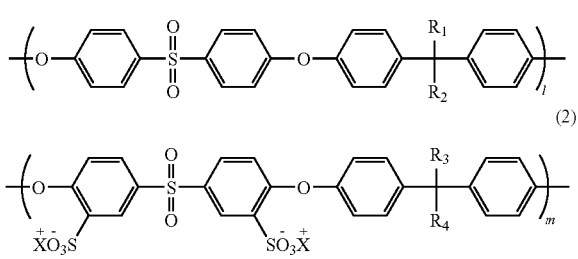

In formulae (1) and (2), l and m are integers of 1-200;

each of $R_1$ through $R_4$ is independently hydrogen, fluorine, or a $C_1$-$C_{10}$ alkyl group optionally substituted by one or more fluorine atoms; and X represents a tetraalkylamine cation.

A multiblock copolymer according to an aspect of the present invention includes a rigid polysulfone repeating unit (hereinafter, also referred to as "rigid block Ri") and a sulfonated polysulfone repeating unit (hereinafter, also referred to as "sulfonated block S") that can form an ionic channel. The rigid block Ri and the sulfonated block S tend to be easy to break. Therefore, the multiblock copolymer includes an ethylenic unsaturated group at its terminal that is flexible and thus can strengthen the mechanical properties of the multiblock copolymer. As a result, the multiblock copolymer has both high ionic conductivity and superior mechanical properties. In addition, the structure of the multiblock copolymer can be varied by appropriately combining the repeating units to increase selectivity to a solvent used when manufacturing a polymer electrolyte membrane.

The tetraalkylamine cation may include a $C_1$-$C_{10}$ alkyl group optionally substituted by one or more fluorine atoms.

In the multiblock copolymer according to an aspect of the present invention, the number of the polysulfone repeating units and the number of the sulfonated polysulfone repeating units may be in the range of 1-200.

The ratio between the polysulfone repeating units and the sulfonated polysulfone repeating units can be varied to obtain desired physical properties. For example, the ratio of m to l may be in a range of 20:100-80:100. Nanostructures having various shapes and sizes can be formed according to the ratio between the polysulfone repeating units and the sulfonated polysulfone repeating units, molecular weight, etc. For example, a cylindrical nanostructure, a layered nanostructure, etc., can be formed.

In addition, the multiblock copolymer may have a weight average molecular weight of 2,000-50,000.

According to another aspect of the present invention, there is provided a method of preparing a multiblock copolymer, the method comprising: synthesizing a polymer of formula (3) below having a polysulfone repeating unit and a sulfonated polysulfone repeating unit by polymerizing disodiumsulfonate dichlorodiphenyl sulfone, dichlorodiphenylsulfone, and bisphenol A, wherein l and m are integers of 1-200; and

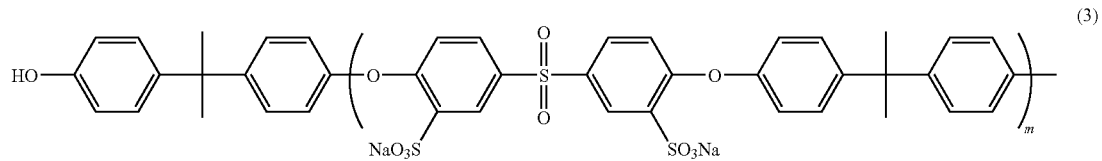

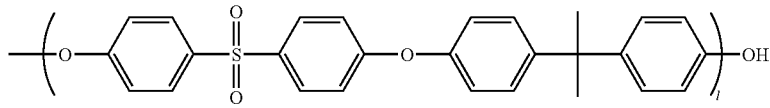

reacting the polymer of formula (3) with a tetraalkylammonium hydride and an ethylenic unsaturated compound to substitute a $Na^+$ ion in the polymer with a tetraalkylamine cation and add a reactive group having an ethylenic unsaturated group to a terminal of the polymer.

In the method of preparing a multiblock copolymer according to an aspect of the present invention, initially, disodiumsulfonate dichlorodiphenyl sulfone, dichlorodiphenylsulfone, and bisphenol A are polymerized in a solvent such as, for example, toluene, butanol, dimethylacetamide, dimethylsulfoxide, a mixture thereof, etc., in the presence of $K_2CO_3$ to prepare a polymer having a polysulfone block Ri and a sulfonated polysulfone block S. This reaction is illustrated in Reaction Scheme (1) below. As a non-limiting example, the reaction can be performed at 170° C. for 4 hours, 160° C. for 48 hours, and then 160° C. for 24 hours.

Reaction Scheme (1)

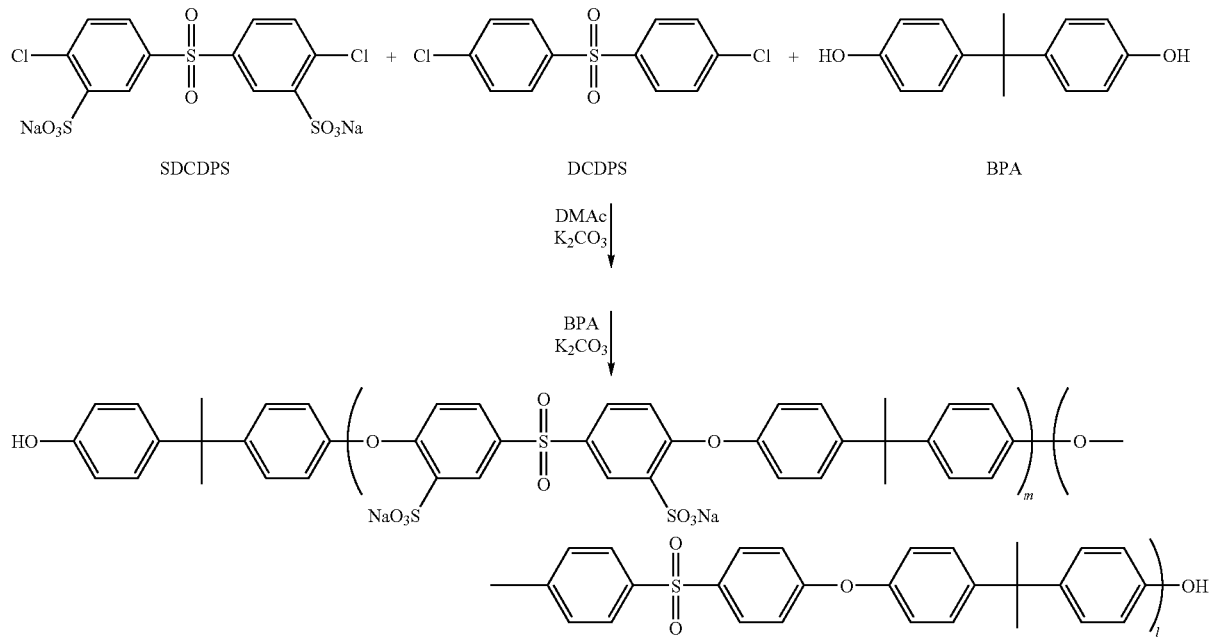

Next, the polymer prepared according to Reaction Scheme (1) is reacted with a tetraalkylammonium hydride (tetrabutylammonium hydride in Reaction Scheme (2)) and an ethylenic unsaturated compound (allylchloride in Reaction Scheme (2)) in a solvent such as chlorobenzene to substitute the Na+ion in the polymer with a tetraalkylamine cation and add an ethylenic unsaturated group to at least one terminal of the polymer. This allylation reaction is illustrated in Reaction Scheme (2) below. As a non-limiting example, this reaction may be performed in a sodium hydroxide solution having a concentration of about 12.5 N Reaction Scheme (2)

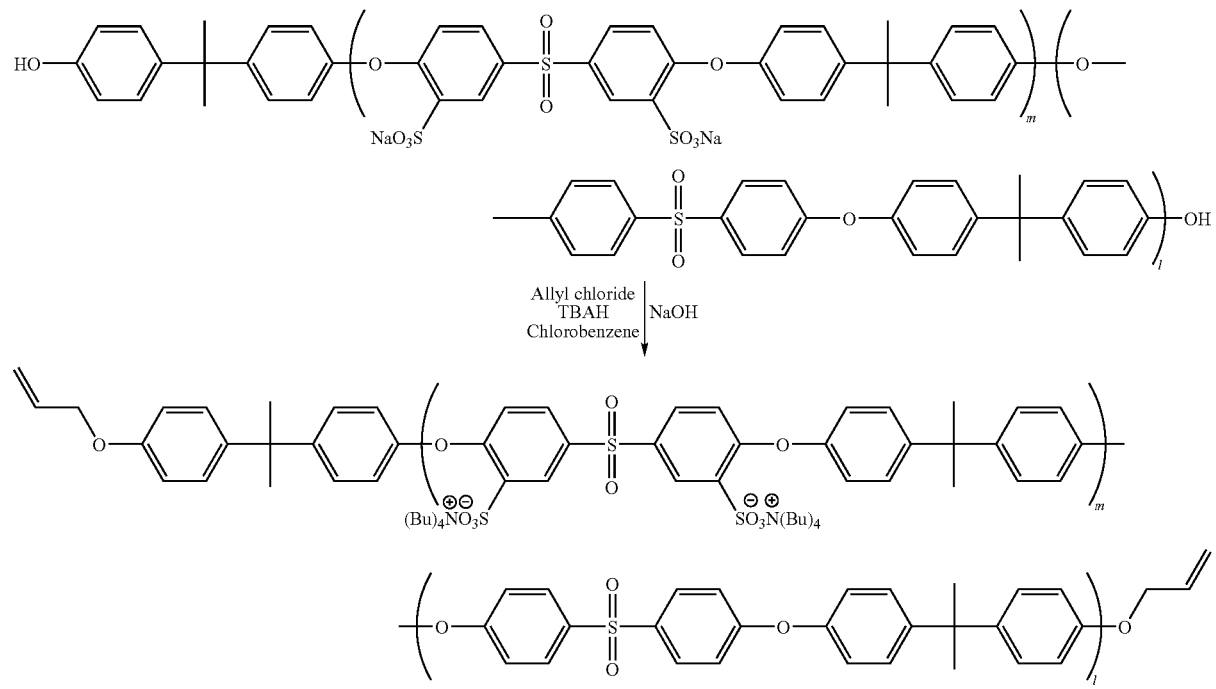

A multiblock copolymer having a $(Bu)_4N^+$ group, which is the reaction product in Reaction Scheme 2, is dissolved in a solvent when used to manufacture a polymer electrolyte membrane. Next, the polymer electrolyte membrane is used in a fuel cell after the $(Bu)_4N^+$ group in the polymer electrolyte membrane is substituted by $H^+$.

In addition, when 4-vinylbenzyl chloride, instead of allyl-chloride, is used for allylation in Reaction Scheme 2, a multi-block copolymer of formula (4) below can be obtained.

The multiblock copolymer according to an aspect of the present invention has a high ionic conductivity and good mechanical properties, and the structure of the multiblock copolymer can be varied to increase selectivity to a solvent used in a polymer electrolyte membrane.

Major products resulting from the curing of the multiblock copolymer can be, for example, products A and B in Reaction Scheme (3) below resulting from a chain elongation reaction in a chain direction of the multiblock copolymer.

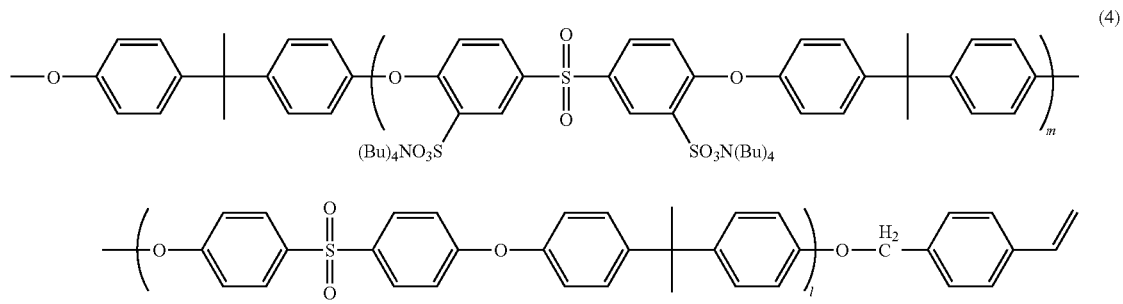

(4)

According to another aspect of the present invention, there is provided a method of preparing a polymer electrolyte membrane, the method comprising: curing the above-described multiblock copolymer; soaking the cured multiblock polymer in an acid solution to allow protonation; and washing the hydrogenated multiblock polymer in deionized water.

The curing may be performed at a temperature of 180-220° C. for 30 minutes-6 hours.

When the curing temperature is lower than 180° C., the multiblock copolymer may not cure. When the curing temperature is higher than 220° C., thermal energy may be lost due to the high-temperature process. When the curing time is shorter than 30 minutes, the curing may be insufficient. When the curing time is longer than 6 hours, the curing time may be unnecessarily long.

Thermally cross-linkable terminal groups of the multi-block copolymer are cross-linked through the curing reaction. The resulting polymer electrolyte membrane after the thermal curing is less likely to swell in a solvent and can minimize the crossover of methanol that is used as fuel in DMFCs. In other words, the polymer electrolyte membrane according to an aspect of the present invention is a thermally-crosslinked polymer membrane.

Next, the cured multiblock copolymer is soaked in an acid solution for protonation. Through this protonation, the tetraalkylamine cation of the cured multiblock copolymer is substituted by $H^+$. The acid solution can be an acid solution, such as a sulfuric acid solution or hydrochloric acid solution having a concentration of 1.0-2.0 M. The cured multiblock copolymer may be soaked in an acid solution having a temperature of 70-90° C. for 3-5 hours. When the temperature of the acid solution is lower than 70° C., the time spent in the protonation may be unnecessarily long. When the soaking time is shorter than 3 hours, the protonation may be insufficient.

Finally, the protonated product is washed in deionized water and dried, thereby resulting in a polymer electrolyte membrane according to an aspect of the present invention.

Aspects of the present invention provide a polymer electrolyte membrane prepared using the above-described method.

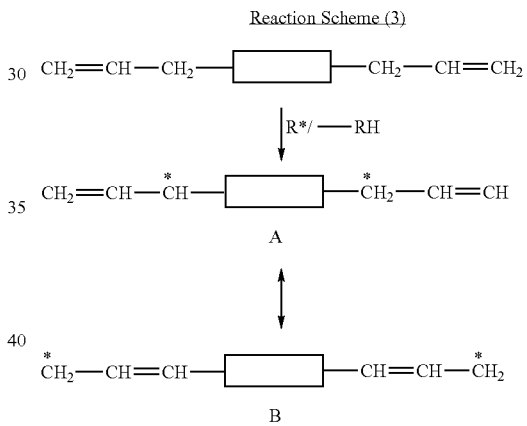

In addition, as a product resulting from a side reaction, for example, product C in Reaction Scheme (4) below resulting from radical polymerization in a direction crossing the chain of the multiblock copolymer can be generated.

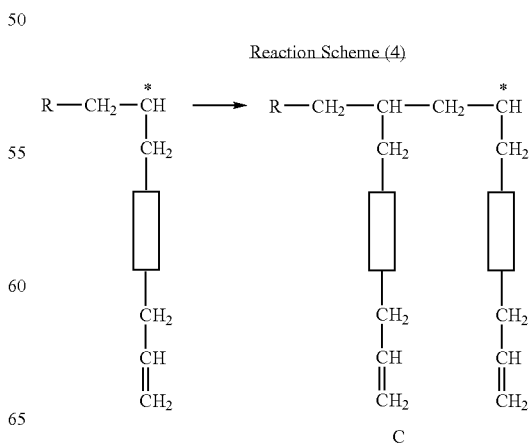

Thus, the thermally-crosslinked polymer electrolyte membrane may have a polymeric structure of formula (5) below.

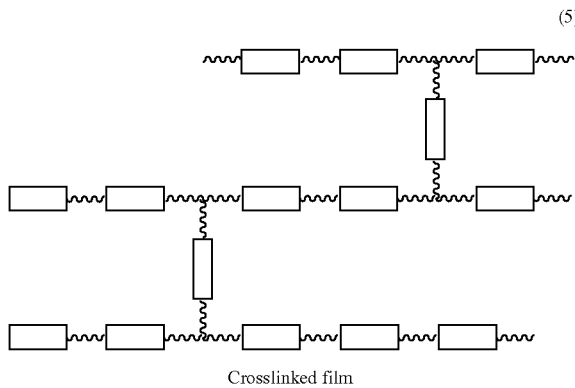

Crosslinked film (5)

According to another aspect of the present invention, there is provided a fuel cell including the polymer electrolyte membrane. The fuel cell according to this aspect of the present invention includes a cathode, an anode, and the polymer electrolyte membrane interposed between the cathode and the anode.

Each of the cathode and the anode includes a gas diffusion layer and a catalyst layer. The catalyst layer contains a metallic catalyst catalyzing reactions in the fuel cell, such as oxidation of hydrogen and reduction of oxygen. For example, the catalyst layer may contain at least one catalyst selected from among Pt, Ru, Os, a Pt—Os alloy, a Pt—Pd alloy, and a Pt—M alloy where M is at least one transition metal selected from among Ga, Ti, V, Cr, Mn, Fe, Co, Ni, Cu, and Zn. In an embodiment of the present invention, the catalyst layer may contain at least one catalyst selected from among Pt, Ru, Os, a Pt—Ru alloy, a Pt—Os alloy, a Pt—Pd alloy, a Pt—Co alloy, and a Pt—Ni alloy.

In general, the metal catalyst can be a supported catalyst. A support for the supported catalyst can be carbon, such as acetylene black, graphite, etc., or inorganic fine particles, such as alumina, silica, etc. In addition, any commercially available supported-precious metal or a supported-precious metal prepared by infiltrating a precious metal into a support can be used as the metal catalyst.

Carbon paper or carbon cloth can be used for the gas diffusion layer. However, examples of materials for the gas diffusion layer are not limited thereto. The gas diffusion layer supports electrodes of a fuel cell and diffuses a reaction gas into the catalyst layer to allow the reaction gas to easily access the catalyst layer. A gas diffusion layer obtained by treating carbon paper or carbon cloth with a fluorine-based resin, such as polytetrafluoroethylene, to be waterproofed may be used to prevent a decrease in gas diffusion efficiency due to the generation of water during the operation of the fuel cell.

The electrodes may further include a microporous layer between the gas diffusion layer and the catalyst layer to enhance the gas diffusion effect of the gas diffusion layer. The microporous layer is formed using a composition containing a conductive material, such as carbon powder, carbon black, active carbon, acetylene black, etc. and a binder, such as polytetrafluoroethylene, through a coating process. The composition may further contain an ionomer if required.

The fuel cell according to an aspect of the present invention may be a DMFC.

Hereinafter, a DMFC as an example of a fuel cell according to an aspect of the present invention using the polymer electrolyte membrane described above will be described with reference to FIG. 1.

A DMFC according to an embodiment of the present invention has a structure illustrated in FIG. 1.

Referring to FIG. 1, the DMFC includes an anode 32 to which fuel is supplied, a cathode 30 to which an oxidant is supplied, and an electrolyte membrane 41 interposed between the anode 32 and the cathode 30. In general, the anode 32 includes an anode diffusion layer 22 and an anode catalyst layer 33. The cathode 30 includes a cathode diffusion layer 32 and a cathode catalyst layer 31.

A methanol solution that enters the catalyst layer 33 of the anode 32 through the diffusion layer 22 decomposes into electrons, protons, carbon dioxide, etc. The protons migrate to the cathode catalyst layer 31 through the electrolyte membrane 41, the electrons are transported to an external circuit, and the carbon dioxide is externally exhausted. In the cathode catalyst layer 31, the proton ions transported through the electrolyte membrane 41, electrons supplied from an external circuit, and oxygen in air supplied through the cathode diffusion layer 32 react together to produce water.

Hereinafter, aspects of the present invention will be described in greater detail with reference to the following examples. The following examples are for illustrative purposes only and are not intended to limit the scope of the invention.

Example 1

Preparation of Multiblock Copolymer 1-1: Polymerization of Polysulfone Block and Sulfonated Polysulfone Block 4.9 g of disodiumsulfonate dichlorodiphenyl sulfone dried at 70° C., 2.87 g of dichlorodiphenylsulfone, 4.56 g of bisphenol-A, 11.04 g of $K_2CO_3$ (80 mmol), 60 mL of purified dimethylacetamide, and 30 mL of toluene were put into a 250 mL, 3-neck flask under a nitrogen atmosphere and reacted in a dehydration reaction at 170° C. for 4 hours. After the reaction product was further reacted at 160° C. for 48 hours, 0.456 g of bisphenol-A, and 31.104 g of $K_2CO_3$ were added to the reaction product and the mixture was maintained at 160° C. for 24 hours to hydroxylate terminal groups. The reaction solution was precipitated with isopropyl alcohol to obtain a solid. The solid was vacuum dried at 70° C. The dried solid was pulverized, desalted with distilled water, filtered, and then vacuum-dried at 70° C. to obtain an oligo-sulfone.

Figure 2:
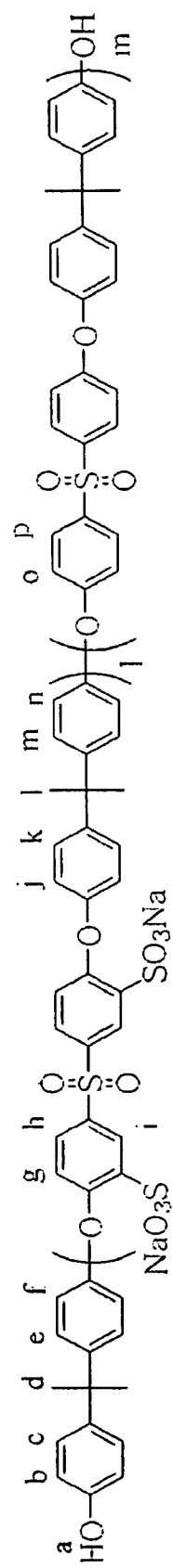
FIG. 2 shows the result of 1H-NMR spectroscopy on a multiblock copolymer including a polysulfone block and a sulfonated polysulfone block prepared in Example 1.
Figure 2:
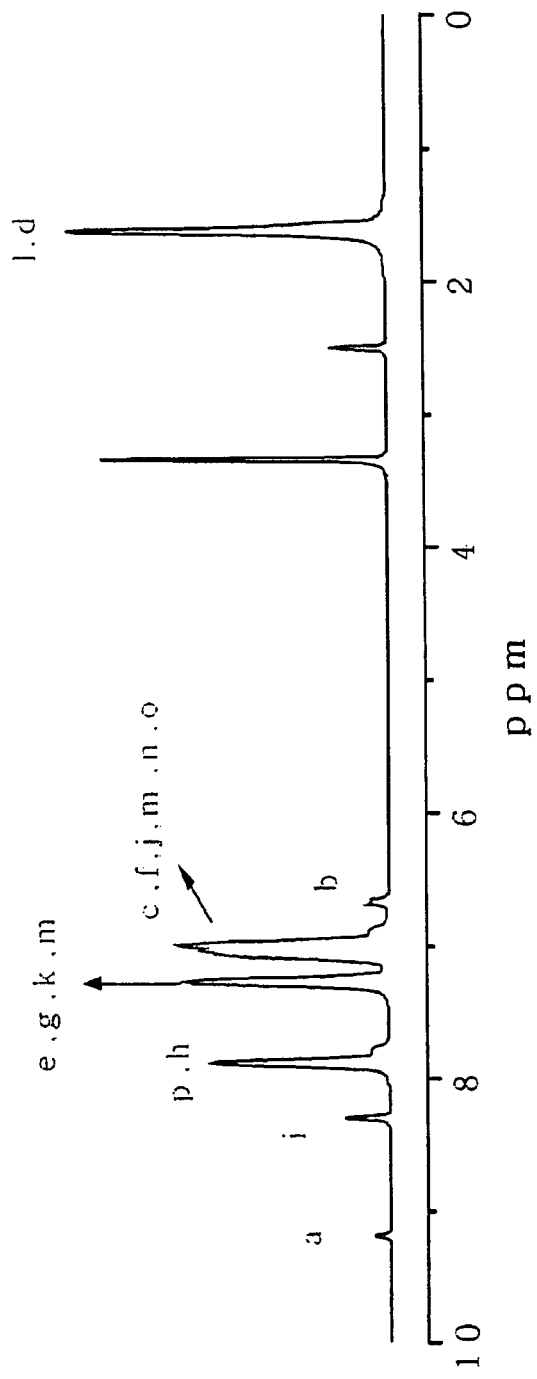

FIG. 2 shows the result of 1H-NMR spectroscopy on the polymer synthesized above, and Table 1 shows the molecular weights of oligo-sulfones, the number of the polysulfone repeating units and sulfonated polysulfone repeating units in various synthesized oligo-sulfones, the mole % of disulfonate dichlorodiphenyl sulfone in monomers that were used, and the mole % of disulfonate dichlorodiphenyl sulfone in the synthesized polymer.

TABLE 1

| Polymer System | Molecular Weight[a] (g/mol) | L + m[b] | Mole % of disulfonate dichlorodiphenyl sulfone in used monomer | Mole % of disulfonate dichlorodiphenylsulfone in synthesized polymer[c] |
|---|---|---|---|---|
| OHPSF-20 | 6451 | 12-13 | 20 | 18 |
| OHPSF-30 | 4232 | 8-9 | 30 | 21 |
| OHPSF-40 | 4343 | 7-8 | 40 | 40 |
| OHPSF-50 | 6358 | 11-12 | 50 | 48 |

[a] and [b] were calculated based on 1H-NMR spectra
[c] = l/((l + m) × 100 (%)
OHPSF-20, OHPSF-30, OHPSF-40, and OHPSF-40 indicate polymer systems containing 20 mole %, 30 mole %, 40 mole %, and 50 mole % of disulfonate dichlorodiphenyl sulfone, respectively, based on the total amount of disulfonate dichlorodiphenyl sulfone and dichlorodiphenylsulfone.

EXAMPLES 1-2

Addition of Reactive Group Including Ethylenic Unsaturated Group To Terminals of Polymer Synthesized In Example 1-1

7 g of the oligo-sulfone synthesized in Example 1-1, 8.25 g of tetrabutyl ammonium hydrogen sulfate, 50 mL of chlorobenzene, 8 mL of allylchloride, and 8 mL of 12.5N-sodium hydroxide were put into a 250 mL, 2-neck flask and vigorously stirred for 24 hours. The organic phase was separated from the reaction mixture and precipitated in n-hexane. The n-hexane was removed, and the precipitate was vacuum-dried at 70° C. and washed with distilled water. Finally, the distilled water was removed through filtration, and the resulting product was vacuum-dried at 70° C. The solid materials did not dissolve well at an early stage of the reaction but became soluble as Na was substituted by (Bu$_4$N). The solubility of the solid materials was lower when a larger amount of disulfonate dichlorophenyl sulfonate was used.

Figure 3:
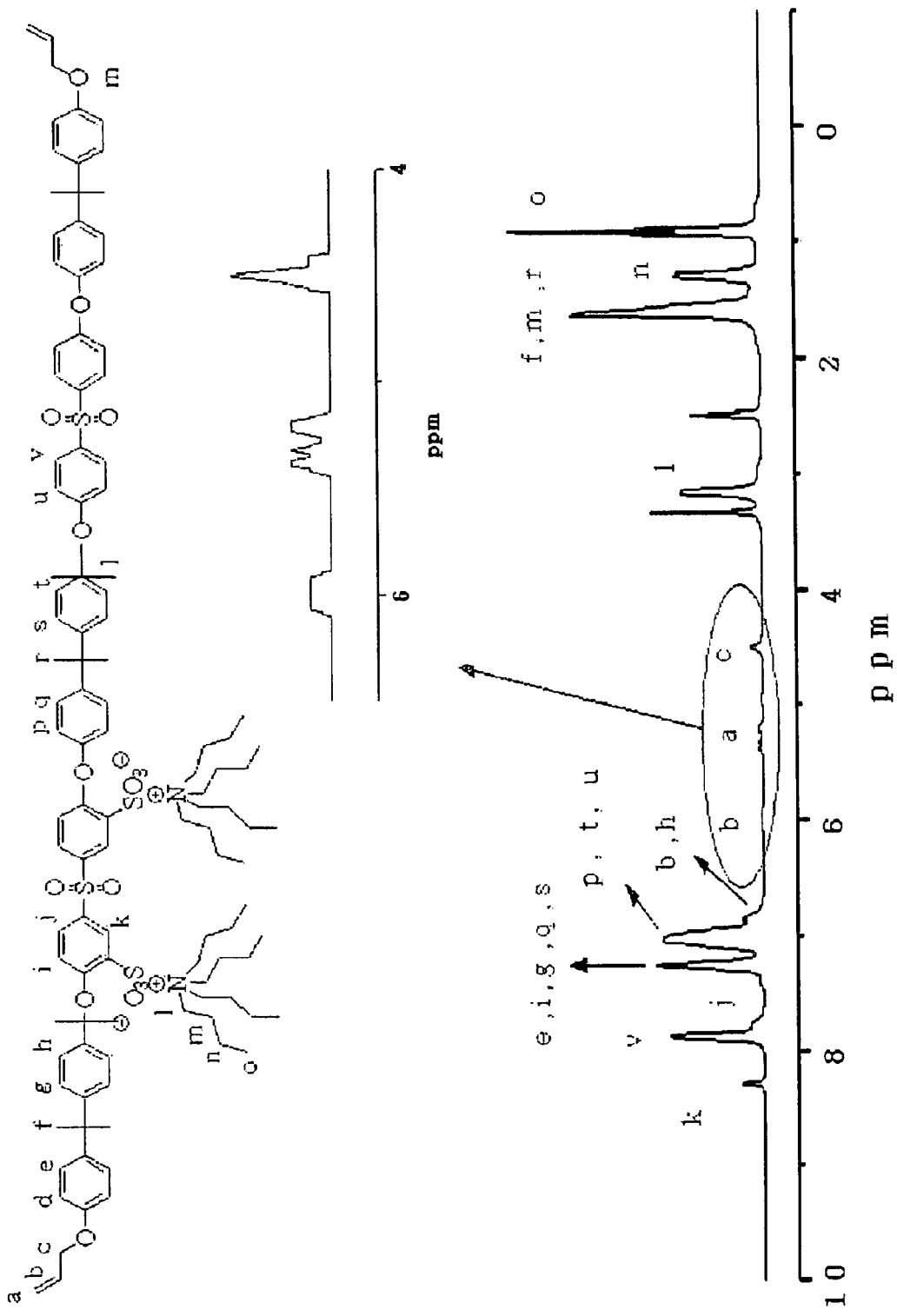
FIG. 3 shows the result of 1H-NMR spectroscopy on an allylated multiblock copolymer including a polysulfone block and a sulfonated polysulfone block prepared in Example 1.

FIG. 3 shows the result of 1H-NMR spectroscopy on the allylated oligo-sulfone synthesized above, and Table 2 shows the molecular weights of oligo-sulfones, the number of the polysulfone repeating units and sulfonated polysulfone repeating units in various synthesized oligo-sulfones, and the mole % of disulfonate dichlorodiphenyl sulfonate in the synthesized polymer.

TABLE 2

| Polymer System | Molecular Weight[a] (g/mol) | l + m[b] | Mole % of disulfone dichlorodiphenyl sulfonate in synthesized polymer |
|---|---|---|---|
| AEPSF-20 | 8973 | 15-16 | 22 |
| AEPSF-30 | 6344 | 10-11 | 27 |
| AEPSF-40 | 5374 | 9-10 | 36 |
| AEPSF-50 | 10502 | 13-14 | 60 |

[a] and [b] were calculated based on 1H-NMR spectra
c = l/((l + m) × 100 (%)
(AEPSF-20, AEPSF-30, AEPSF-40, and AEPSF-50 indicate polymer systems containing 20 mole %, 30 mole %, 40 mole %, and 50 mole % of allylated disulfonate dichlorodiphenyl sulfone, respectively, based on the total amount of allylated disulfonate dichlorodiphenyl sulfone and dichlorodiphenylsulfone.)

Example 2

Manufacture of Polymer Electrolyte Membrane

The multiblock copolymer obtained in Example 1 was thermally cured at 200° C. for 3 hours. Next, the cured multiblock copolymer was soaked in a 1.5M H$_2$SO$_4$ solution at 80° C. for 4 hours to allow protonation. The protonated product was washed in deionized water and dried to obtain a polymer electrolyte membrane having a thickness of 100 μm.

Figure 4:
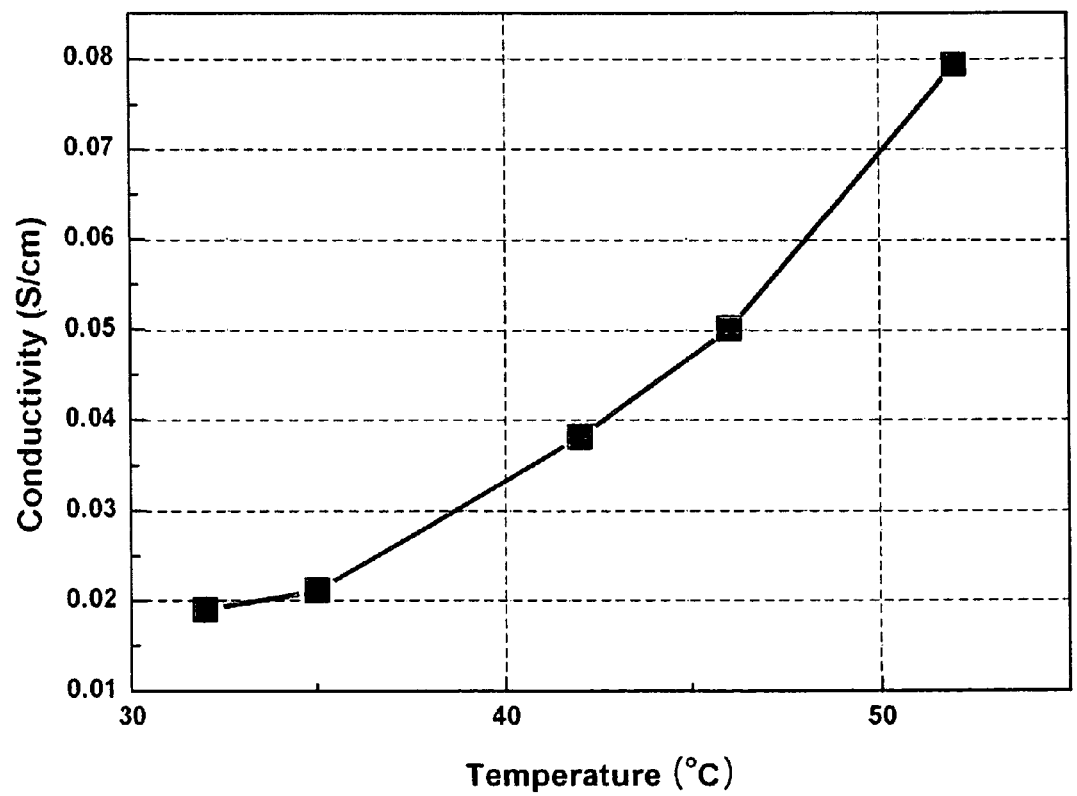
FIG. 4 is a graph of ionic conductivity of a polymer electrolyte membrane prepared in Example 2 with respect to temperature.

FIG. 4 is a graph of ionic conductivity of the polymer electrolyte membrane (polysulfone repeating unit:sulfonated polysulfone repeating unit=5:5) with respect to temperature. As is apparent from the results in FIG. 4, the polymer electrolyte membrane containing a multiblock copolymer according to an aspect of the present invention has high ionic conductivities at temperatures ranging from 30° C. to 60° C.

As described above, according to aspects of the present invention, a polymer electrolyte membrane that has a high ionic conductivity and good mechanical properties and minimizes crossover of methanol can be manufactured at low cost. In addition, the structure of the multiblock copolymer can be varied to increase selectivity to a solvent used in a polymer electrolyte membrane.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A multiblock copolymer comprising:
   a polysulfone repeating unit of formula (1) below;
   a sulfonated polysulfone repeating unit of formula (2) below; and
   an ethylenic unsaturated group at least one terminal of the multiblock copolymer:

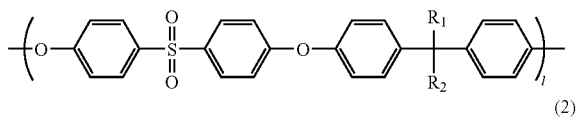

(1)

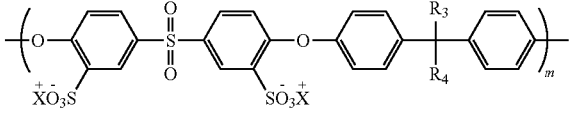

(2)

where l and m are integers of 1-200; each of $R_1$ through $R_4$ is independently hydrogen, fluorine, or a $C_1$-$C_{10}$ alkyl group optionally substituted by one or more fluorine atoms; and X represents a tetraalkylamine cation.

2. The multiblock copolymer of claim 1, wherein the tetraalkylamine cation includes a $C_1$-$C_{10}$ alkyl group optionally substituted by one or more fluorine atoms.

3. The multiblock copolymer of claim 1, wherein the ratio of m to l is in a range of 20:100 to 80:100.

4. The multiblock copolymer of claim 1, wherein the multiblock copolymer has a weight average molecular weight of 2,000-50,000.

* * * * *